(12) United States Patent
Shen et al.

(10) Patent No.: US 8,212,530 B2
(45) Date of Patent: Jul. 3, 2012

(54) BATTERY MODULE AND METHOD FOR DETERMINING BATTERY ID AND TEMPERATURE

(75) Inventors: Jean-Lieh Shen, Taoyuan (TW);
Chih-Chung Teng, Taoyuan (TW);
Chung-Yi Pan, Taoyuan (TW)

(73) Assignee: HTC Corporation, Taoyuan County (TW)

(*) Notice: Subject to any disclaimer, the term of this patent is extended or adjusted under 35 U.S.C. 154(b) by 633 days.

(21) Appl. No.: 12/346,792

(22) Filed: Dec. 30, 2008

(65) Prior Publication Data

US 2009/0167246 A1 Jul. 2, 2009

(30) Foreign Application Priority Data

Dec. 31, 2007 (TW) .............................. 96151488 A

(51) Int. Cl.
*H02J 7/04* (2006.01)
*H02J 7/16* (2006.01)
(52) U.S. Cl. ......... 320/150; 320/128; 320/134; 320/136
(58) Field of Classification Search .................. 320/106, 320/150, 152, 166, 109, 128–136, 149, 160, 320/144, 154, 153
See application file for complete search history.

(56) References Cited

U.S. PATENT DOCUMENTS

| | | | |
|---|---|---|---|
| 5,489,834 A | 2/1996 | Pitkanen | |
| 5,945,803 A * | 8/1999 | Brotto et al. | 320/106 |
| 6,246,201 B1 | 6/2001 | Aderek et al. | |
| 6,246,210 B1 | 6/2001 | Kuan et al. | |
| 6,430,517 B1 * | 8/2002 | Williams | 702/63 |
| 7,221,124 B2 * | 5/2007 | Howard et al. | 320/106 |
| 2006/0197499 A1 | 9/2006 | Bucur et al. | |
| 2008/0238357 A1 * | 10/2008 | Bourilkov et al. | 320/106 |

FOREIGN PATENT DOCUMENTS

| | | |
|---|---|---|
| CN | 1277746 A | 12/2000 |
| CN | 1134874 C | 1/2004 |
| DE | 19817423 A1 | 10/1999 |
| JP | 5251113 A | 9/1993 |
| JP | 6333604 A | 12/1994 |
| TW | 350029 | 1/1999 |
| TW | 200614625 A | 5/2006 |

* cited by examiner

*Primary Examiner* — Patrick Assouad
*Assistant Examiner* — Alesa Allgood
(74) *Attorney, Agent, or Firm* — Rabin & Berdo, P.C.

(57) ABSTRACT

A battery module for a portable electronic device is disclosed. The battery module is connected with the portable electronic device with at least three contacts. The battery module includes a battery, a recognition circuit, and a thermal sensing circuit. The recognition circuit has an energy storage element and a current limiting element, and the thermal sensing circuit has a switch and a thermal sensing element. The thermal sensing element varies its electric parameter in accordance with the temperature of the battery module. With the charging curve of charging the energy storage element by way of the current limiting element, the portable electronic device can determine a battery type, and the thermal sensing circuit is then initiated to acquire the thermal information of the battery module.

17 Claims, 6 Drawing Sheets

BATTERY MODULE AND METHOD FOR DETERMINING BATTERY ID AND TEMPERATURE

RELATED APPLICATIONS

This application claims priority to Taiwan Application Serial Number 96151488, filed Dec. 31, 2007, which is herein incorporated by reference.

BACKGROUND

1. Field of Invention

The invention is related to a battery module and a method for determining battery module ID and temperature thereof, more particularly, to a battery module for a portable electronic device.

2. Description of Related Art

A battery module can provide energy for operating portable electronic devices (such as mobile phone, person digital assistant, etc.). Every battery module needs to be charged when the power within it is almost run out. However, before a charging operation, a battery type of the battery module should be determined so as to provide an appropriate charging current and voltage according to the specification of the battery module. Temperature is also an important criterion for determining the charging current and voltage. For example, if the temperature of the battery module is too high, the charging current should be reduced or turned off to ensure the battery used in a safe environment.

For acquiring signals related to battery types and temperatures of different battery modules and determining charging states, three or four electrodes positioned on the battery modules are implemented. However, comparing with the four electrodes, battery modules with the three electrodes have an advantage of lowering cost and size.

FIG. 1 is a schematic graph of a conventional battery module. The battery module 10 includes a battery 11, a negative temperature coefficient thermistor NTC1, resistors R1 and R2, and electrodes 12, 13 and 14. The anode of the battery is connected to the electrode 14, and the cathode is connected to the electrode 12. The resistor R1 is serially connected to the resistor R2, and the resistors R1 and R2 are separately connected to the electrodes 12 and 13. Also, the thermistor NTC1 is parallelly connected to the resistor R2. A voltage or current is applied to the electrode 13, and a signal is measured on the electrode 13. The signal is determined with an equivalent resistance of the thermistor NTC1, the resistors R1 and R2. With the signal, the battery type and temperature of the battery module 10 are determined.

FIG. 2a is schematic graph showing resistance ranges of different conventional battery modules. In a first battery module type, the resistances of the resistors R1 and R2 are respectively selected as R1' and R2', and the equivalent resistance of the thermistor NTC1, and the resistors R1 and R2 fall in the range between R1' and R1'+R2'. Also, in a second type of battery module, the resistances of the resistors R1 and R2 are respectively selected as R1" and R2", and the equivalent resistance falls in a range of R1"~R1"+R2".

Accordingly, when the equivalent resistance is in the range of R1'~R1'+R2', the battery module will be classified as the first type and the temperature of which is also acquired, thus the battery is charged according to the charging specification of the first type of battery module. Similarly, when the equivalent resistance is in the range of R1"~R1"+R2", the corresponding battery will be classified as the second type and the temperature of which is also acquired, thus the battery is charged according to the charging specification of the second type of battery module.

FIG. 2b is another schematic graph showing resistance ranges of different conventional battery modules. Please refer to FIG. 1 and FIG. 2b. If the equivalent resistances of two types of battery module partially overlap with each other, as illustrated in the range between R1' and R1"+R2", and the equivalent resistance measured falls in the range between R1' and R1"+R2" (such as the shadow in the FIG. 2b), it is hard to determine the battery type and temperature of the battery module. Thus, charging the battery module with an appropriate current and voltage is also impossible. To prevent such overlaps, ranges of equivalent resistances of different battery types of battery modules must be shortened, but the shortened ranges reduce the accuracy for determining the temperature of the battery.

Therefore, a new battery module and charging device should be provided to solve aforesaid problem and would have the ability to modulate the charging current and voltage in accordance with the battery type and temperature of the battery module.

SUMMARY

One aspect of the disclosure is to provide a battery module, which is integrated into a portable electronic device, which can precisely determine the battery type and temperature of a battery module so as to provide the battery with an appropriate charging current and voltage at lower costs.

Another aspect of the disclosure is to provide a method for determining the charging state of the battery module. The charging state determining method is used to determine the battery type and temperature of a battery so as to provide the battery with an appropriate charging current and voltage at lower costs.

According to one of aforesaid aspects, the disclosure provides a battery module. An interface of the battery module, which is connected to a portable electronic device, has at least a first terminal, a second terminal, and a third terminal. The battery module comprises: a battery, a recognition circuit and a thermal sensing circuit. The anode and cathode of the battery are respectively connected with the second terminal and first terminal. The recognition circuit includes an energy storage element and a current limiting element, and the thermal sensing circuit includes a switch and a thermal sensing element. Connections between different elements will be described as follow: one end of the energy storage element is connected to the first terminal, a current limiting element is serially connected between the energy storage element and the third terminal, one end of the switch is connected to the first terminal, and the thermal sensing element is serially connecting between the switch and the third terminal. Besides, the resistance of the thermal sensing element varies with the temperature of the battery module.

With the charging curve of charging the energy storage element by way of the current limiting element, the portable electronic device can recognize a battery type, and the switch is turned on to initiate the thermal sensing circuit so as to acquire the thermal information of the battery module.

According to another one of aforesaid aspects, the disclosure provides an electronic device. The electronic device includes a reference power source, a battery module and a charging state controlling device. The battery module comprises: a battery, a recognition circuit and a thermal sensing circuit. The recognition circuit includes an energy storage element and a current limiting element, and the thermal sensing circuit includes a switch and a thermal sensing element. Besides, an interface of the battery module, which is connected to a portable electronic device, has at least a first terminal, a second terminal, and a third terminal. The anode and cathode of the battery are respectively connected with the second terminal and first terminal. One end of the energy storage element is connected to the first terminal, and a current limiting element is serially connected between the energy storage element and the third terminal. One end of the switch is connected to the first terminal, and the thermal sensing element is serially connected between the switch and the third terminal. Furthermore, the resistance of the thermal sensing element varies with the temperature of the battery module.

Also, with the charging curve of charging the energy storage element by way of the current limiting element, the portable electronic device can recognize a battery type, and the switch is then turned on to initiate the thermal sensing circuit so as to acquire the thermal information of the battery module. According to an embodiment of the disclosure, the operation of the switch can directly be under the control of the voltage of energy storage element being charged.

According to the aforesaid aspects, the disclosure provides a method for determining a charging state of a battery module to charge the battery module in accordance with a battery type of and a temperature of the battery module. The method includes steps of providing a current by way of a current limiting element to charge an energy storage element; determining a type of the battery module in accordance with a terminal voltage of the energy storage element at a first time; providing the current flowing through a thermal sensing element; and determining a temperature of the battery module by measuring a terminal voltage of the thermal sensing element at a second time.

By the above description, with the battery module and the method for determining the charging state of the battery module, a charging state can be adjusted in accordance with battery types and temperatures of different battery modules. On the other hand, it is not necessary to implement additional terminals, thus an advantage of lowering cost is achieved.

Another advantage of this method is that temperature measurement has higher accuracy. This is because compare to prior art, the resistance range need to be separate into two range but this method can use the complete range for temperature measurement.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying drawings, wherein.

DESCRIPTION OF THE PREFERRED EMBODIMENTS

Charging and discharging curves of energy storage elements vary with electric parameters of the energy storage elements and current limiting element connected thereto. Different parameters result in different charging and discharging curves. With such characteristics, the following embodiments are configured to precisely select an appropriate charging state for a battery module in accordance with battery type and temperature.

The battery module and the charging device of the following embodiments are configured to be connected to or within a portable electronic device, such as a mobile phone, a personal digital assistant, and a notebook etc. The following embodiments implement the mobile phone for the sake of clarity.

Figure 1:
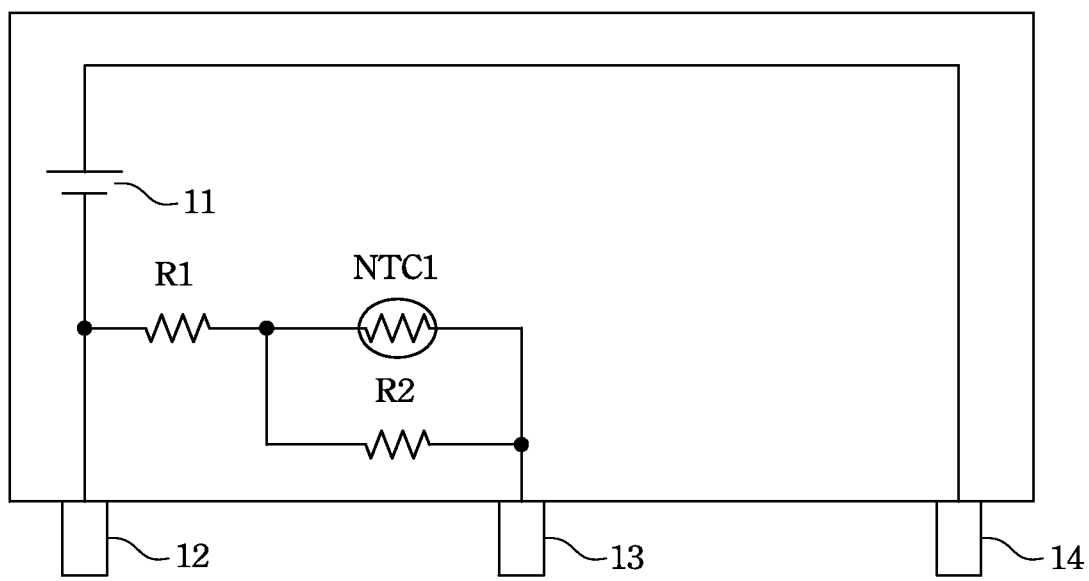
FIG. 1 illustrates a conventional battery module.
Figure 2A:
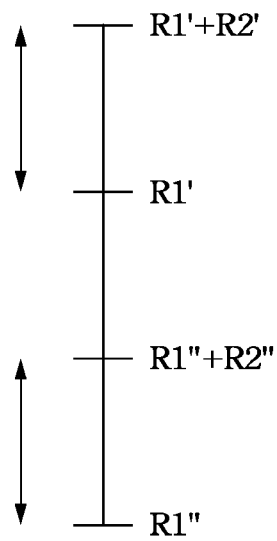
FIG. 2a illustrates resistance ranges of different conventional battery modules.
Figure 2B:
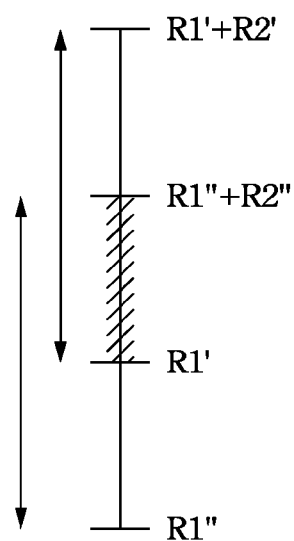
FIG. 2b illustrates resistance ranges of different conventional battery modules.
Figure 3A:
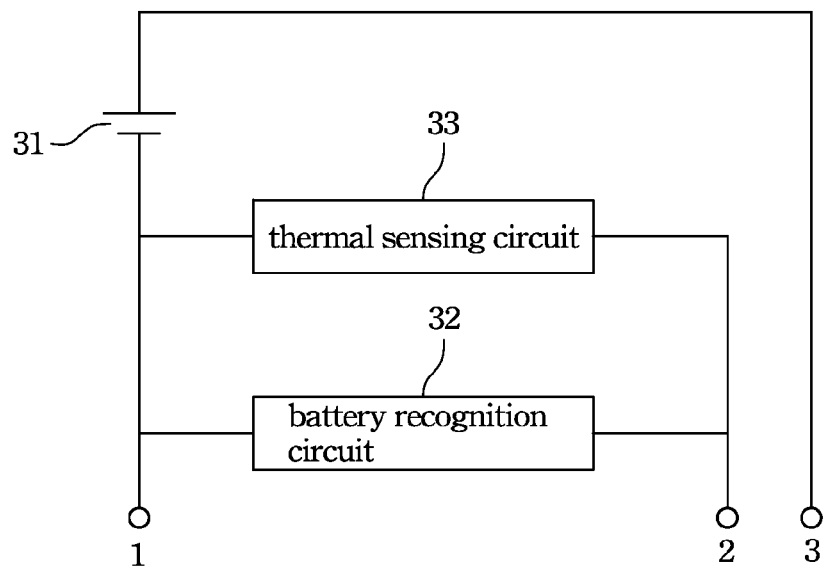
FIG. 3a illustrates a battery module in accordance with an embodiment of the disclosure.

FIG. 3a illustrates a battery module in accordance with an embodiment of the disclosure. Please refer to FIG. 3a, a battery module 30 includes a battery 31, a battery recognition circuit 32, a thermal sensing circuit 33, and terminals 1, 2 and 3 to connect to the mobile phone. The anode and cathode of the battery are respectively connected with the terminal 3 and 1, and the battery recognition circuit 32 and the thermal sensing circuit 33 is positioned between the terminal 1 and 2. With the battery recognition circuit 32 and the thermal sensing circuit 33, the battery type and temperature can be respectively acquired.

Figure 3B:
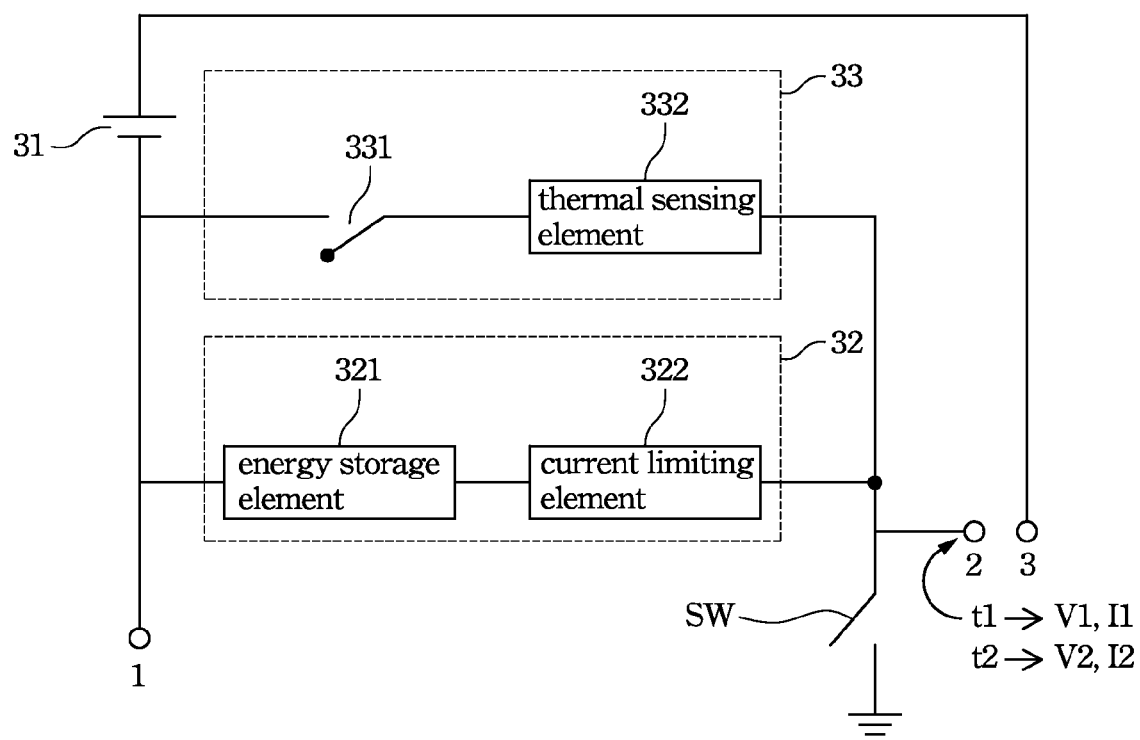
FIG. 3b illustrates a battery module in accordance with another embodiment of the disclosure.

FIG. 3b illustrates a battery module in accordance with another embodiment of the disclosure. A battery module 30 includes a battery 31, a battery recognition circuit 32, a thermal sensing circuit 33. The recognition circuit 32 has an energy storage element 321, a current limiting element 322, and the thermal sensing circuit 33 has a switch 331 and a thermal sensing element 332. The energy storage element 321 is serially connected to the current limiting element 322, and the switch 331 is serially connected to the thermal sensing element 332 between a terminal 1 and 2. In such configuration, when the switch 331 is turned on, the thermal sensing element 332 is connected to a terminal 1 via the switch 331. Preferably, the operation of the switch 331 may be controlled by the charging state of the energy storage element 321. Beside, the resistance of the thermal sensing element 332 varies with the temperature of the battery module 30.

A reference power source provides a current to the battery recognition circuit 32 via the terminal 2, and the current charges the energy storage element 321 via the current limiting element 322. Voltages V1 and V2 can be received at terminal 2 respectively at a first and second time t1 and t2, and the voltage V1 is meant to determine the battery type of the battery module 30, and the voltage V2 is meant to determine the temperature of the battery module 30. Generally, the voltage V1 is measured before the energy storage element 321 is fully charged, and the voltage V2 is measured after the energy storage element 321 is fully charged.

Note that the voltages V1 and V2 are only exemplary, according to characteristics of the energy storage element 321 and the current limiting element 322, currents I1 and I2 can also be measured at the terminal 2 respectively at the first and second times t1 and t2.

At the first time t1, the switch 331 is turned off, and a current flowing through the current limiting element 322 charges the energy storage element 321, and the voltage V1 is determined by the electric parameters of the energy storage element 321 and the current limiting element 322. At the second time t2, the energy storage element 321 is in a steady state, the switch 331 is turned on, and the current flows through the thermal sensing element 332, thus the voltage V2 is determined by the electric parameters of the thermal sensing element 332.

To upgrade the accuracy of the voltages V1 and V2, ensuring the charging state of the energy storage element 321 is essential. Therefore, before the current is provided to the energy storage element 321, terminal 2 is connected to ground by turning on a switch SW so as to discharge the energy storage element 321. By discharging the energy storage element 321, the accuracy of the voltages V1 and V2 can be ensured. Later, the voltages V1 and V2 are analyzed to determine the battery type and temperature of the battery module 30.

Figure 4:
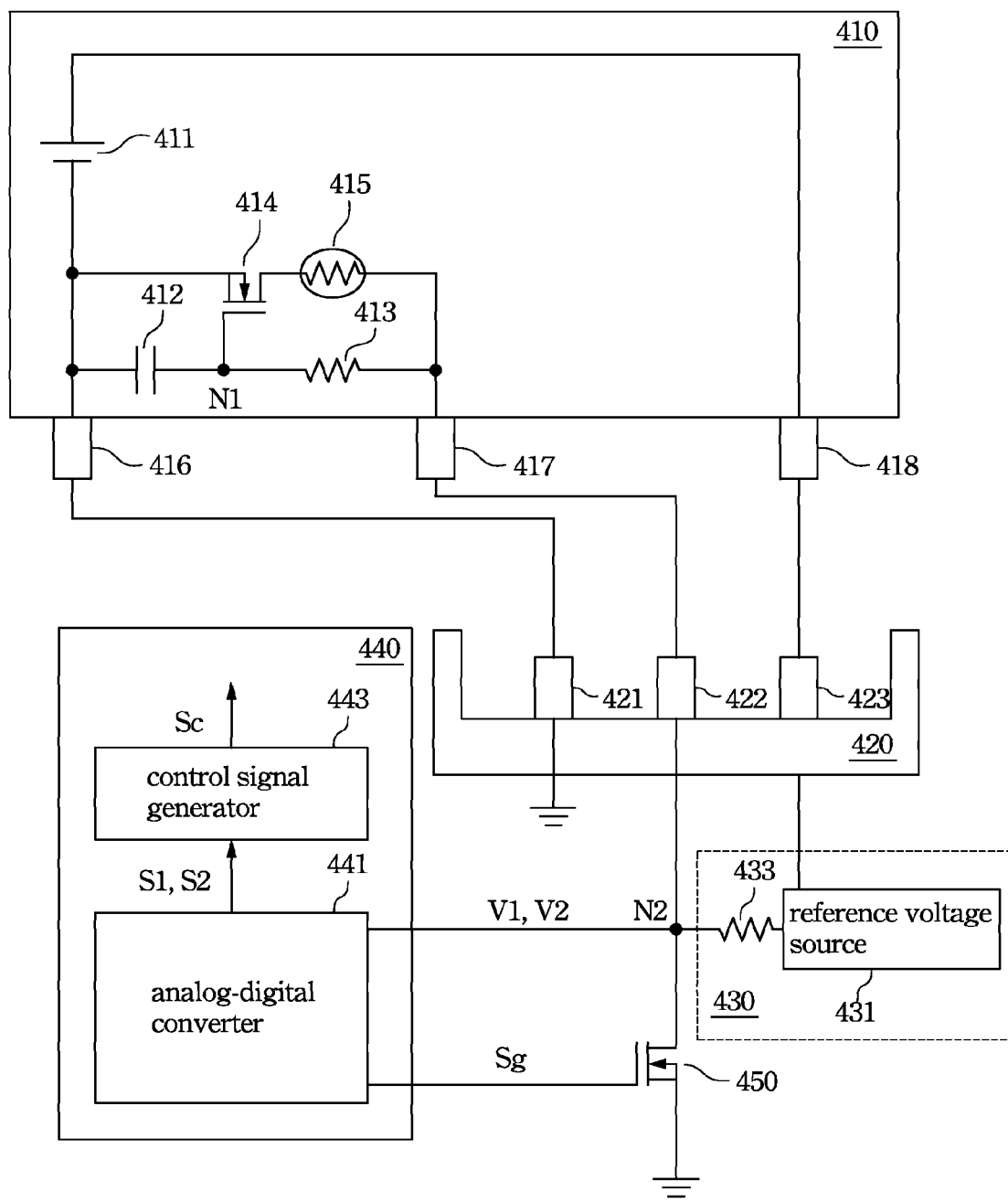
FIG. 4 illustrates an exemplary circuit of a battery module and a charging device in accordance with a preferred embodiment of the disclosure.

FIG. 4 illustrates an exemplary circuit of a battery module and a charging device in accordance with a preferred embodiment of the disclosure. The charging device could be configured in a portable electronic device, such as a mobile phone, to charge the aforesaid battery module. Please refer to FIG. 4, a charging device 400 for charging a battery module 410 includes a connector 420, a reference power source 430 and a microcontroller (MCU) 440.

The battery module 410 illustrates more details compared with the battery module 30 shown in FIG. 3b. The battery module 410 includes a battery 411, a capacitor 412 (i.e. an energy storage element), a resistor 413 (i.e. a current limiting element), an NMOS transistor 414 (i.e. a switch), a negative temperature coefficient thermistor 415 (i.e. a thermal sensing element), and electrodes 416, 417 and 418. The anode of the battery 411 is connected to the electrode 418, and the cathode is connected to the electrode 416. The capacitor 412 is serially connected to the resistor 413 between the electrodes 416 and 417. Besides, the transistor 414 is positioned between the electrode 416 and the thermistor 415, and the gate of the transistor 414 is connected to a node N1 between the capacitor 412 and resistor 413, thus a terminal voltage of the capacitor 412 controls the operation of the transistor 414. When the transistor 414 is turned on, the thermistor 415 is connected with the electrode 416 via the transistor 414. On the other hand, the thermistor 415 is also connected to the electrode 417. The resistance of the thermistor 415 varies with a temperature of the battery module 410.

The reference power source 430 provides a current flowing through the resistor to charge the capacitor 412 via the electrode 417, at a first time t1 and a second time t2, the microcontroller 440 respectively receives the voltages V1 and V2 and analyzes them to determine the battery type and temperature of the battery module 410. Generally, the voltage V1 is received before the energy storage element 412 is fully charged, and the voltage V2 is received after the energy storage element 412 is fully charged.

The connector 420 includes electrodes 421, 422 and 423 respectively connected to the electrodes 416, 417 and 418. The electrode 421 is connected to ground, the electrode 422 is connected to the microcontroller 440 and the electrode 423 is connected to the reference power source 430. The connector 420 is fixed within the mobile phone to transmit energy and signals to the mobile phone so as to provide energy for the mobile phone.

The reference power source 430 may include a reference voltage source 431 and a resistor 433. Alternatively, the reference voltage source 431 is connected to the electrode 423 to receive energy from the battery 411. The energy would be transformed into a constant voltage, and the constant voltage would charge the capacitor 412 through the resistor 413 via the electrode 417.

Also, in an embodiment in accordance with the preferred embodiment, a reference current source is implemented to replace the reference voltage source 431, and an inductor is implemented to replace the capacitor 412, and a current-controlled switch is implemented to replace the NMOS transistor 414. In a similar way as described above, the battery type and temperature of a battery module would be determined with accuracy in the embodiment.

The microcontroller 440 has an analog-digital converter (ADC) 441 and a control signal generator 443. The analog-digital converter 441 transforms the voltages V1 and V2 into digital signals S1 and S2, the control signal generator 443 generates signals to charger that charges the battery module 410 in accordance with the digital signals S1 and S2.

To ensure the accuracy of the voltages V1 and V2 is essential to ensure the charge on the capacitor 412 is zero. Therefore, a NMOS transistor 450 is implemented in the preferred embodiment as a switch to connect the capacitor to ground. The gate of the transistor 450 is connected to the microcontroller 440, the drain of the transistor 450 is connected to the electrode 422. Before the reference power source charging the capacitor, the electrode 417 is connected to ground via the transistor 450 to discharge the capacitor 412. Microcontroller would output a control signal Sg to the gate of the transistor to controller the switching operation between the drain and the gate of the transistor 450.

After the energy stored in the capacitor is discharged, the accuracy of the voltages V1 and V2 could be ensured. Later, the voltages V1 and V2 would be analyzed to determine the battery type and temperature of the battery module 410.

The operation of the transistor 414 is controlled with a charging voltage of the capacitor 412. Originally, there is no charge existing in the capacitor 412, and the transistor 414 is turned off. After the capacitor 412 starts to be charged, a terminal voltage of the capacitor 412, i.e., the voltage on the node N1, is lower than a threshold voltage of the transistor 414, thus the transistor is still turned off. After a period of time of charging (e.g. the capacitor is fully charged and reaches a steady state), the voltage on the node N1 is higher than the threshold voltage, and the transistor is then turned on.

Figure 5:
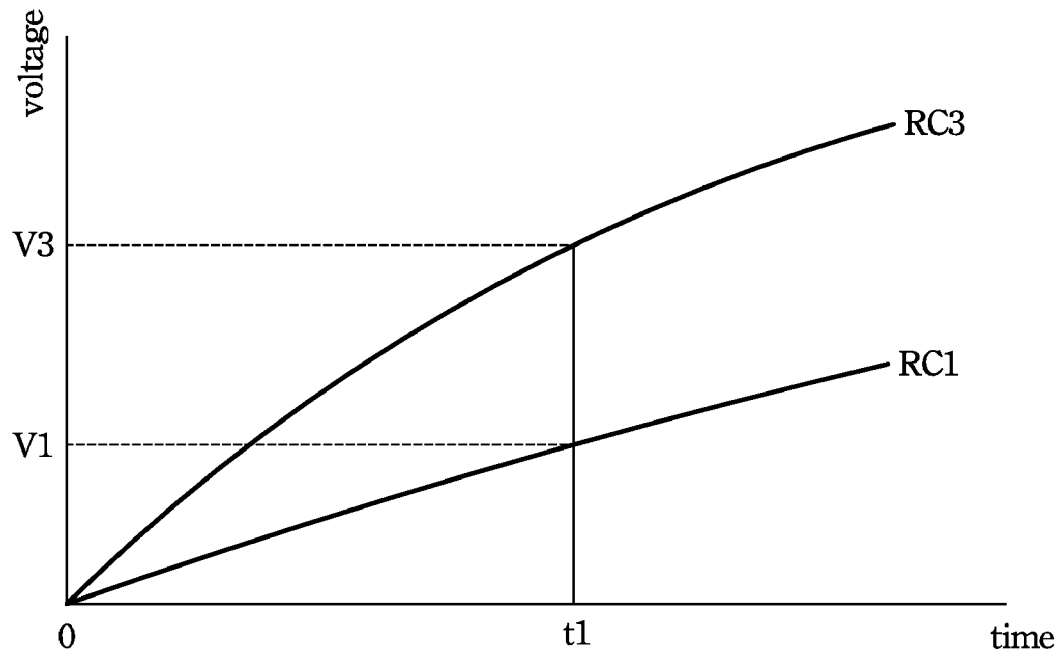
FIG. 5 illustrates charging curves for different battery modules showing voltages varying with the time in accordance with a preferred embodiment of the disclosure.

FIG. 5 illustrates charging curves for different battery modules showing voltages varying with the time in accordance with a preferred embodiment of the disclosure. Please refer to FIG. 4 and FIG. 5, before t=0, the microcontroller 440 outputs a control signal Sg with a high voltage level to turn on the transistor 450 so as to connect the capacitor 412 to ground and thus discharge the capacitor 412. Later, microcontroller 440 switches control signal Sg to a low voltage level to turn off the transistor.

After transistor 450 turned off, the reference power source 430 provides the current to start charging the capacitor 412 via the electrode 422. Since the terminal voltage of the capacitor is still lower than the threshold voltage of the transistor 414, the transistor 414 is still turned off, and the current flows through the resistor 413 and the capacitor 412. The analog-digital converter 441 receives the voltage V1 on the electrode 417 via a node N2 at the first time t1 and transforms the voltage V1 into digital signals S1 to facilitate the following analysis. In the embodiment, the voltage V1 varies with a product RC of the capacitance C of the capacitor 412 and the resistance R of the resistor 413. Therefore, with different capacitances C and resistances R in different battery modules, the battery types of the battery modules can be determined. That is, different battery modules have different RC products, the higher the RC product, the lower the voltage V1 received. For example, if two different battery modules have the same resistance R, and the capacitances of which are respectively C1 and C3, and C1>C3, then V1<V3. By measuring the voltage at the first time t1, the type of the battery module can be determined with accuracy.

Figure 6:
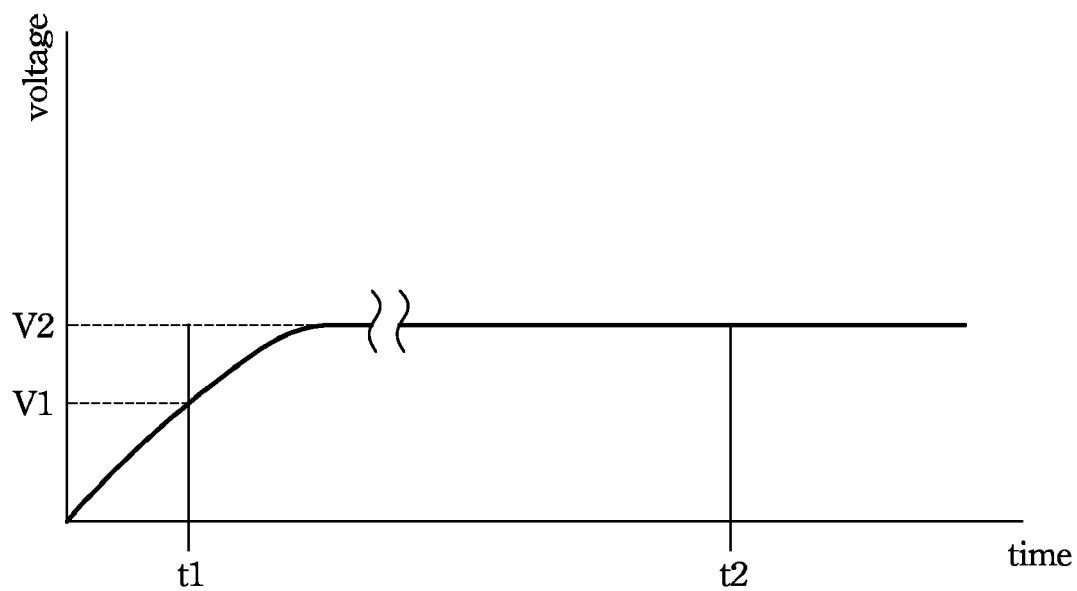
FIG. 6 illustrates a charging curve for a battery module showing a voltage varying with the time in accordance with a preferred embodiment of the disclosure.

FIG. 6 illustrates a charging curve for a battery module showing voltage varying with the time in accordance with a preferred embodiment of the disclosure. Please refer to FIG. 4 and FIG. 6. After the capacitor 412 has been charging for a period of time, the voltage on the node N1 is higher than the threshold voltage of the transistor 414, then the transistor is turned on, and the current flows through the thermistor 415. Furthermore, the analog-digital converter 441 receives the voltage V2 on the electrode 417 via the node N2 at the second time, and converts the voltage V2 into the digital signal S2 for the following analysis. In the embodiment, since the voltage varies with the resistance of the thermistor 415 determined by the temperature of the battery module 410, the voltage V2 would differ in different temperatures. Thus, the battery type of the battery module 410 can be determined with accuracy by analyzing the voltage V2 at the second time t2.

As shown in FIG. 6, the analog-digital converter 441 sequentially receives the voltage V1 and V2 on the electrode 417 at the time t1 and the second time t2. The voltage V1 is meant to determine the battery type of the battery module 410, and the voltage V2 is meant to determine the temperature of the battery module 410.

It should be noted that the thermistor 415 and the resistor 413 are not necessarily both connected to the electrode 417, for those skilled in the art, a plurality of electrodes are implemented to respectively connect the thermistor 415 and the resistor 413 without departing from the sprit and range of the disclosure.

Figure 7:
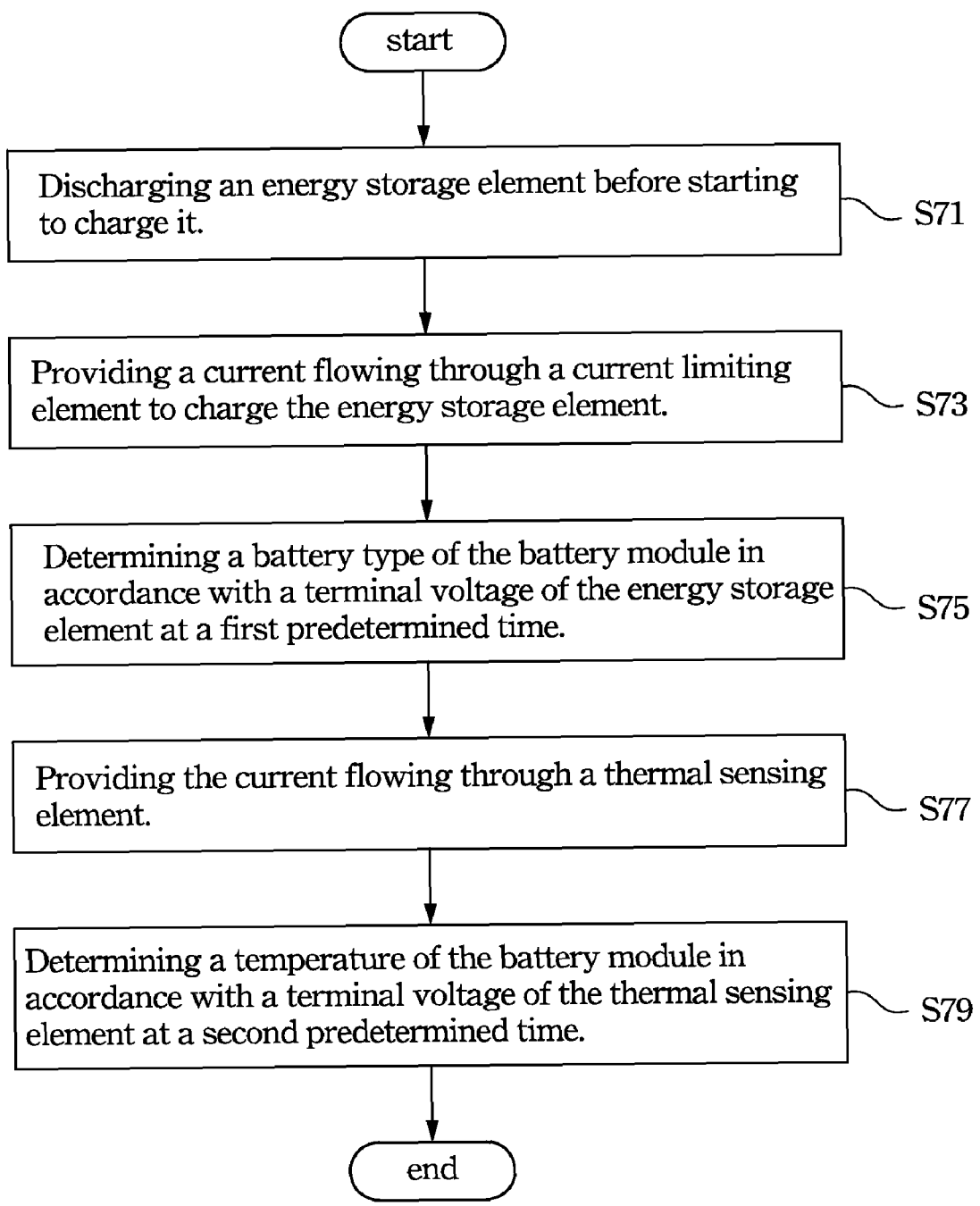
FIG. 7 is a flow chart of a method for determining a charging state of the battery module in accordance with a preferred embodiment of the disclosure.

FIG. 7 is a flow chart of a method for determining the charging state of the battery module in accordance with a preferred embodiment of the disclosure. Please refer to FIG. 7. First, in the step S71, an energy storage element is discharged before starting to charge the energy storage element. Later, a current flowing through a current limiting element is provided to charge an energy storage element, and a battery type of the battery module is determined in accordance with a terminal voltage of the energy storage element at a first time (in the step S73 and S75). Furthermore, in the step S77, the current flowing through a thermal sensing element is provided. Finally, a temperature of the battery module is determined in accordance with a terminal voltage of the thermal sensing element at a second time in the step S79.

As described above, the battery type and the temperature of the battery module of the disclosure can be efficiently and precisely determined without implementing additional electrodes, so as to determine a charging state of the battery module. Therefore, the battery module implemented by a portable electronic device can solve the problem of the conventional art, and has advantages of upgrading the accuracy for determining the charging state and lowering cost.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A battery module located in a portable electronic device, comprising:
    an interface connected to the portable electronic device, said interface having at least a first terminal, a second terminal, and a third terminal;
    a battery, the anode and the cathode of the battery being respectively connected with the third terminal and the first terminal;
    a recognition circuit, including:
        an energy storage element, one end of which is connected to the first terminal; and
        a current limiting element, serially connected between the energy storage element and the second terminal;
    a thermal sensing circuit, including:
        a switch, one end of which is connected to the first terminal; and a thermal sensing element, serially connected between the switch and the second terminal, wherein, the resistance of the thermal sensing element varies with a temperature of the battery module.

2. The battery module of claim 1, wherein if a current charging the energy storage element by way of the current limiting element, a battery type of the battery module is recognized in accordance with a terminal voltage of the energy storage element.

3. The battery module of claim 2, wherein when the switch is turned on, a terminal voltage generated by the current flowing through the thermal sensing element is configured to determine a temperature of the battery module.

4. The battery module of claim 2, wherein the switch is turned on upon a terminal voltage of the energy storage element being charged reaches a threshold voltage of the switch.

5. The battery module of claim 1, wherein a control terminal of the switch is connected to another end of the energy storage element, and the control terminal is used to turn on and off the switch.

6. The battery module of claim 1, wherein the first terminal is connected to ground, the battery provides energy to an external reference power source through the third terminal, and the second terminal is connected to the external reference source.

7. The battery module of claim 1, wherein the energy storage element is a capacitor.

8. The battery module of claim 1, wherein the switch is a transistor, the gate of the transistor is connected to another end of the energy storage element.

9. An electronic device, comprising:
    a reference source;
    a battery module, including:
        a battery, the anode and the cathode of the battery being respectively connected with the third terminal and the first terminal;
        a recognition circuit, including:
            an energy storage element, one end of which is connected to the first terminal; and
            a current limiting element, serially connected between the energy storage element and the second terminal; and
        a thermal sensing circuit, including:
            a first switch, one end of which is connected to the first terminal; and
            a thermal sensing element, serially connected between the first switch and the second terminal, and the resistance of the thermal sensing element varying with a temperature of the battery module; and a charging state controlling device, wherein, the charging state controlling device recognizes a battery type of the battery module in accordance with a terminal voltage of the energy storage element charged by a current flowing through the current limiting element, and when the first switch is turned on, the charging state controlling device determines a temperature of the battery in accordance with a terminal voltage of the thermal sensing element.

10. The electronic device of claim 9, wherein the first switch is turned on upon a terminal voltage of energy storage element reaches a threshold voltage.

11. The electronic device of claim 9, wherein a control terminal of the first switch is connected with another end of the energy storage element, and the control terminal is used to turn on and off the first switch.

12. The electronic device of claim 9, wherein the charging state controlling device is configured to receive a terminal voltage of the energy storage element charged by a current at a first time and a terminal voltage of the thermal sensing element resulted by flowing through of the current at a second time.

13. The electronic device of claim 9, wherein the first terminal is connected to ground, the battery provides energy to an external reference power source through the third terminal, and the second terminal is connected to the external reference source.

14. The electronic device of claim 9, wherein the energy storage element is a capacitor.

15. The electronic device of claim 14, further comprising a second switch connected to the second terminal, wherein when the second switch is turned on, the second terminal is connected to ground for discharging the capacitor.

16. The electronic device of claim 15, wherein the second switch is a second transistor, and the charging state controlling device is used to turn on and off the second transistor.

17. The electronic device of claim 9, wherein the first switch is a first transistor, the gate of the first transistor is connected to another end of the energy storage element.

* * * * *